(12) United States Patent
Telakowski

(10) Patent No.: US 6,537,027 B2
(45) Date of Patent: Mar. 25, 2003

(54) TURBINE NO-LOAD SPEED LIMITER

(75) Inventor: Robert Telakowski, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 09/907,107

(22) Filed: Jul. 17, 2001

(65) Prior Publication Data

US 2003/0017045 A1 Jan. 23, 2003

(51) Int. Cl.[7] ................................................ F01D 1/02
(52) U.S. Cl. .................................. 415/208.2; 415/211.2
(58) Field of Search ........................ 415/208.2, 211.2, 415/206

(56) References Cited

U.S. PATENT DOCUMENTS

| | | | | |
|---|---|---|---|---|
| 2,584,555 A | * | 2/1952 | Cleave et al. ............ | 415/122.1 |
| 2,951,678 A | * | 9/1960 | Cliborn ...................... | 415/123 |
| 3,073,114 A | * | 1/1963 | Wood ......................... | 415/123 |
| 3,574,476 A | * | 4/1971 | Jacomet et al. ............... | 415/36 |
| 4,159,624 A | | 7/1979 | McReynolds | |

* cited by examiner

Primary Examiner—Ninh Nguyen
(74) Attorney, Agent, or Firm—Carlson, Gaskey & Olds

(57) ABSTRACT

A starter is provided including a housing defining a fluid passageway with an inlet and an outlet. A turbine rotor is supported in the housing and includes blades arranged in the passageway between the inlet and the outlet. The rotor is movable within the passageway at a speed with a fluid exiting the blade toward the outlet. A spoiler is arranged in the passageway between the rotor and the outlet. The spoiler deflects the fluid exiting the blade and reduces the rotor speed. Preferably, the present invention spoiler is utilized to reduce the maximum speed at the no-load condition. The angle, number, position, and other characteristics of the spoiler may be tailored for the particular turbine and a particular speed for which it is desirable to reduce.

4 Claims, 3 Drawing Sheets

TURBINE NO-LOAD SPEED LIMITER

BACKGROUND OF THE INVENTION

This invention relates to turbines, and more particularly, a speed limiting mechanisms for turbines.

Turbines have operating characteristics particular to their configuration. For example, axial turbines, which are often used as starters for gas turbines or other types of engines, have a generally linearly decreasing torque versus speed characteristic. At the maximum speed of an axial turbine, the turbine experiences a no-load condition in which there is near-zero torque. Such turbines may fail at the maximum operating speed because the turbine is highly stressed. Therefore, it is desirable to reduce the operating speed of the turbine at the no-load condition. Turbine speed limiting devices are known. For example, the rotational speed of the turbine may be monitored and reduced by modifying the powering characteristics. However, it may be desirable to utilize an additional speed limiting device or use a different speed limiting device altogether than those currently available.

Previously, devices have been used in the diffuser portion of the starter, where fluid is expelled from the turbine, to increase the efficiency of the rotor. Devices such as splitters arranged in the diffuser portion have been used to increase the efficiency and speed of the turbine by enhancing the flow characteristics through the diffuser. Devices such as these may increase the undesirable stresses within the turbine by increasing the speed. The aerodynamic characteristics of the turbine rotor may be changed to reduce the speed of the turbine at the no-load condition, for example, by changing the profile of the rotor blades. Such a change to the rotor blades may undesirably impact other operating characteristics of the turbine and therefore may not be desirable. Therefore, what is needed is a suitable speed limiting device for reducing the turbine speed at the no-load condition without modifying the aerodynamic characteristics of the turbine rotor.

SUMMARY OF THE INVENTION AND ADVANTAGES

The present invention provides a starter including a housing defining a fluid passageway with an inlet and an outlet. A turbine rotor is supported in the housing and includes blades arranged in the passageway between the inlet and the outlet. The rotor rotates within the passageway at a speed with a fluid exiting the blade toward the outlet. A spoiler is arranged in the passageway between the rotor and the outlet. The spoiler deflects the fluid exiting the rotor blade. The disturbance reduces efficiency and reduces rotor speed. Preferably, the present invention spoiler is utilized to reduce the maximum speed at the no-load condition. However, the spoilers may be used to reduce the speed at any load condition. The angle, number, position, and other characteristics of the spoiler may be tailored for the particular turbine and a particular speed for which it is desirable to reduce.

Accordingly, the present invention provides a suitable passive speed limiting device for reducing the turbine speed at the no-load condition without modifying the aerodynamic characteristics of the turbine rotor.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
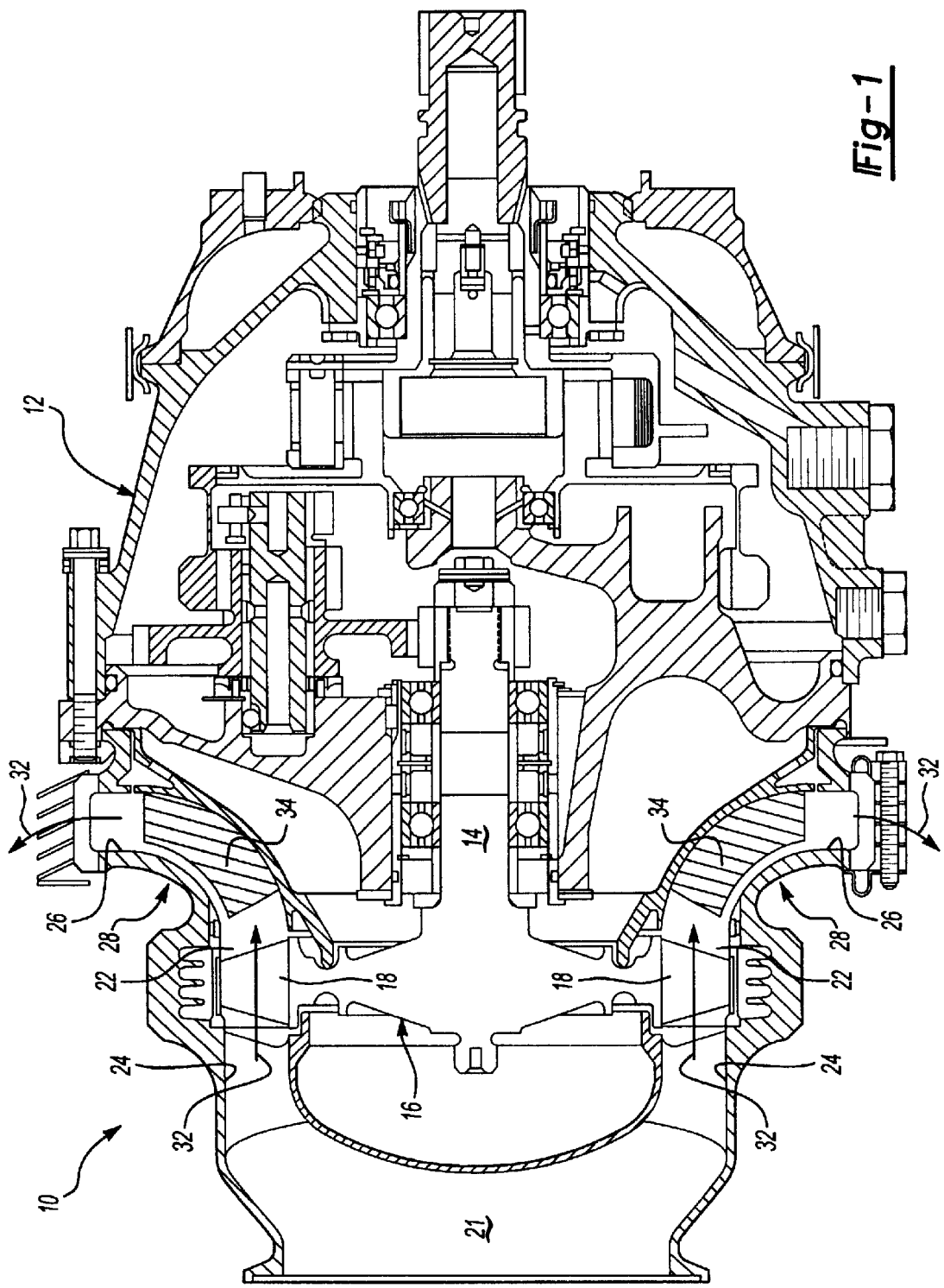
FIG. 1 is a partial cross-sectional view of the present invention axial turbine starter.

A gas turbine engine turbine starter 10 is shown in FIG. 1. The starter 10 is often used to start gas turbines or other types of engines. The starter 10 includes a housing 12 that supports a turbine 16. The turbine 16 includes a shaft 14 having blades 18 extending radially from the shaft 14. Starter housing 12, which may include several portions secured together, defines an intake 21 for channeling air toward the rotor 16.

Figure 2:
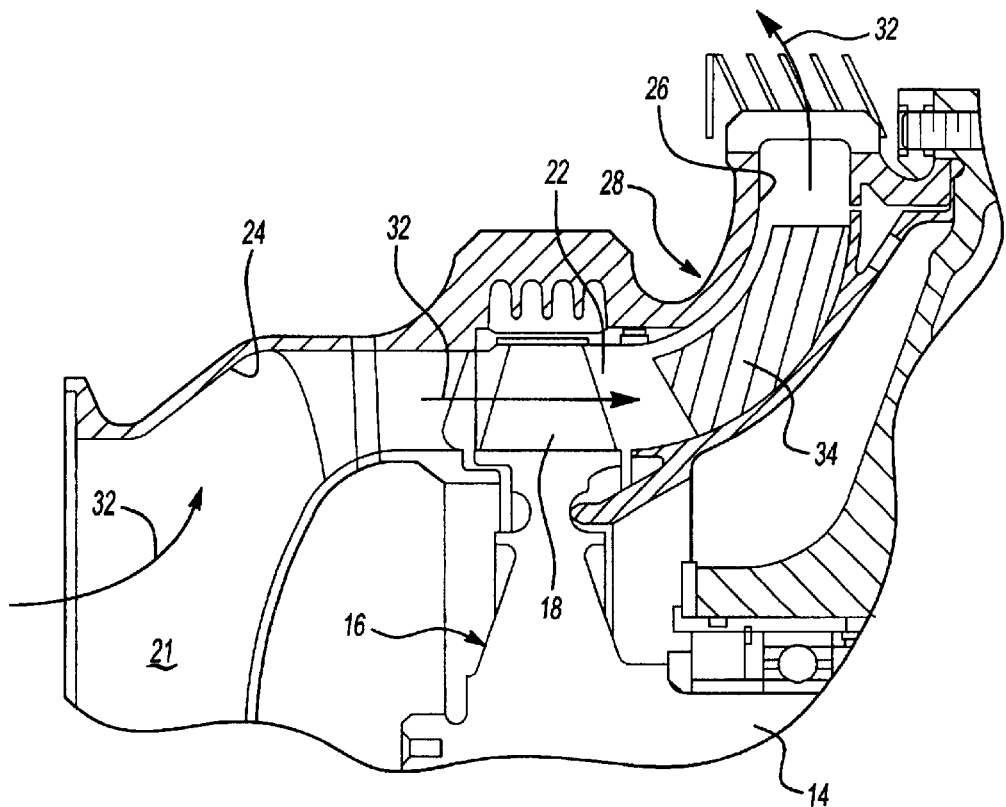
FIG. 2 is an enlarged view of the diffuser portion of the axial turbine starter shown in FIG. 1.

A starter having an axial turbine is shown in FIGS. 1 and 2. The housing 12 further defines a passageway 22 having an inlet 24 and an outlet 26. The rotor blades 18 are arranged between the inlet 24 and outlet 26, the passageway 22 also includes a diffuser portion 28 generally extending from the area proximate to the blades 18 to the outlet 26. In operation, fluid flows from the intake 21 through the inlet 24 of the passageway 22. A pressure differential across the rotor 16 rotates the rotor 16 and shaft 14. Fluid exits the rotor blades 18 and would flow uninterrupted through the diffuser portion 28 and out the outlet 26 for prior art axial turbines.

Figure 3:
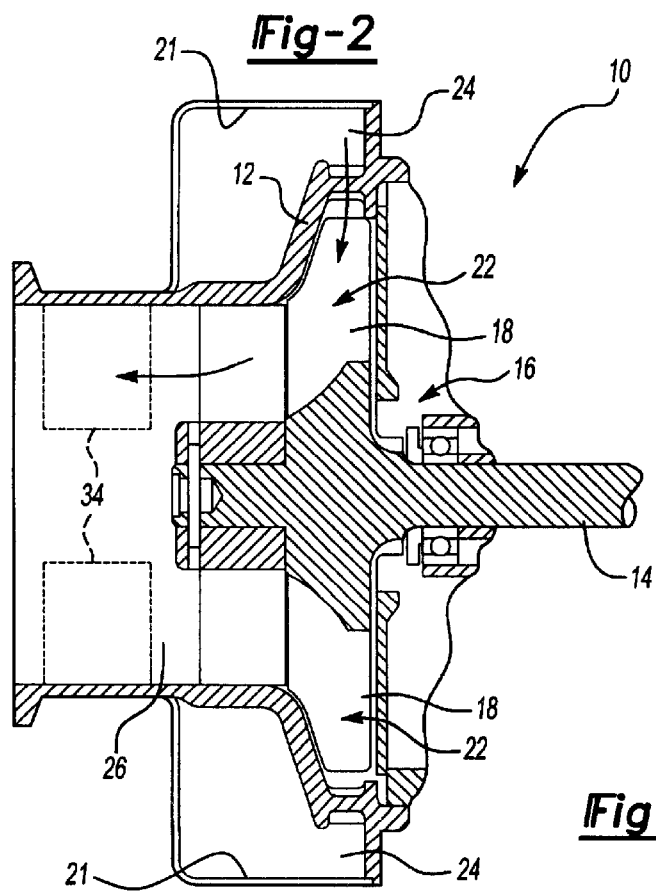
FIG. 3 is a partial cross-sectional view of the present invention radial turbine starter.

A portion of a starter 10 having a radial turbine 16 is shown in FIG. 3. Similar to the axial turbine shown in FIG. 2, the starter 10 has a housing 12 defining a passageway 22 having an inlet 24 and an outlet 26. With radial turbines, the inlet 24 is arranged radially about the starter 10 while the outlet 26 is centrally located. The rotor blades 18 are arranged between the inlet 24 and outlet 26. In operation, fluid flows from the intake 21 through the inlet 24 of the passageway 22. Flow through the rotor 16 rotates the rotor 16 and shaft 14. Fluid exits the rotor blades 18 and would flow uninterrupted through the outlet 26 for prior art axial turbines.

Figure 4:
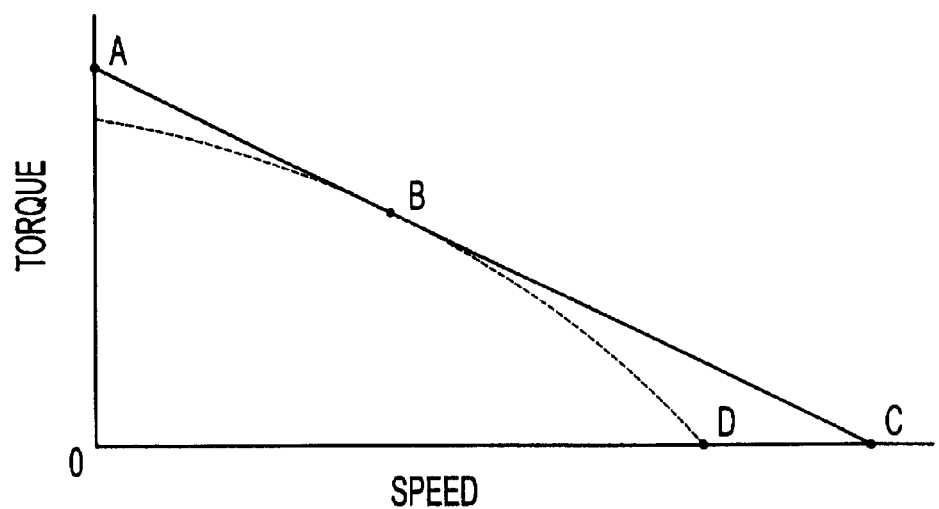
FIG. 4 is a torque versus speed graph for a particular turbine with and without the spoilers of the present invention.

A graph of the torque versus speed characteristics for prior art turbine configurations is shown by the solid line in FIG. 4. The torque versus speed relationship is generally linear, extending from a maximum torque-low speed condition shown at point A, to a maximum speed-no-load condition, shown by point C.

Figure 5:
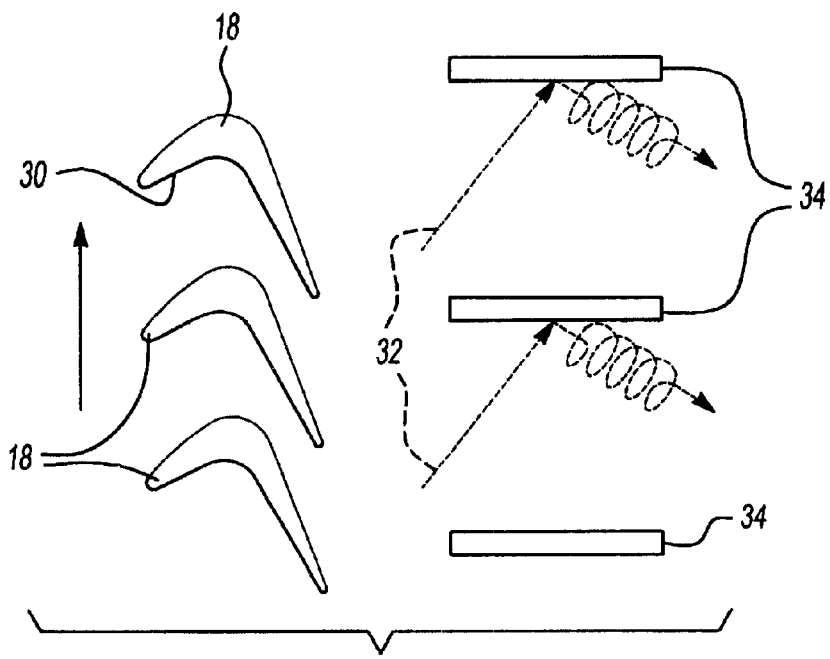
FIG. 5 is a schematic view of the rotor blades and spoiler of the present invention.

With continuing reference to FIG. 4, it may be desirable to reduce the maximum speed at the no-load condition to reduce the potentially damaging stresses on the turbine. To this end, a plurality of spoilers 34 are arranged radially within the passageway 22 between the rotor blades 18 and the outlet 26. Preferably, the spoilers 34 are fixed to the passageway 22. Referring to FIG. 5, the rotor blades 18 have a profile 30 that affects the flow of fluid from the rotor blades 18, which varies throughout the operating speeds of the turbine. Specifically, turbines may be designed such that at their peak efficiency points, the gas exiting the rotor blades 18 leaves with near-zero or negligible swirl. That is, at the peak efficiency point the fluid exiting the rotor blades 18 generates a minimal amount of turbulence. The fluids often exits the rotor blades 18 with an increased swirl, or turbulent flow, at speeds below and above the peak efficiency point.

The spoilers 34 deflect the fluid exiting the blades 18 and reduce the speed of the turbine to a desired rotor speed where the stresses on the turbine are of less concern. The torque versus speed curve for a turbine having the spoilers 34 of the present invention is shown by the dashed line in FIG. 4. The peak efficiency, represented by point B, remains generally the same as with a turbine not having the spoilers of the present invention. In this manner, the peak efficiency may be maintained. However, above and below the efficiency point B, the fluid exits the rotor blades 18 with an increased swirl and collides with the spoilers 34 creating a back pressure in the diffuser portion 28 and slowing the speed of the turbine. As a result, the maximum speed at the no-load condition is reduced, as shown by point D. Said another way, the exiting flow impinges on the spoiler at the condition where speed reduction is required, and the flow runs parallel to the surface of the spoiler at conditions where no reduction is required. However, it is to be understood that the spoilers may be positioned to accommodate normal exiting swirl, that is, as mentioned above, some swirl may exist at the peak efficiency point. This minimal swirl runs generally parallel to the spoiler at the peak efficiency point. Accordingly, the turbine is not permitted to reach high speeds at which the turbine may be highly stressed and potentially fail.

It is to be understood that the spoilers 34 of the present invention need not be limited to reducing the speed at only the no-load condition. The spoiler 34 may be designed to reduce the particular rate of any speed if desirable. Moreover, the number, angle, and other characteristics of the spoiler 34 may be modified to suit a particular turbine and turbine operating conditions.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A starter comprising:
    a housing defining a fluid passageway with an inlet and an outlet;
    a turbine rotor with a blade arranged in said passageway between said inlet and said outlet, said rotor movable within said passageway at a speed with a fluid exiting said blade toward said outlet; and
    a plurality of spoilers disposed in a radial pattern in said passageway between said rotor and said outlet, said spoiler deflecting said fluid exiting said blade and producing a desired rotor speed less than said speed, wherein said speed is a maximum rotor speed producing a no-load condition and said desired rotor speed is less than said maximum rotor speed at said no-load condition, and wherein a particular rotor speed produces a peak efficiency with said fluid exiting said blade and through said spoiler generally uninhibited producing a near-zero swirl at said particular rotor speed.

2. The starter according to claim 1, wherein said spoiler is fixed relative to said passageway.

3. The starter according to claim 1, wherein said rotor is an axial turbine rotor.

4. The starter according to claim 1, wherein said rotor is a radial turbine rotor.

* * * * *